US012585936B2

(12) United States Patent
Canedo et al.

(10) Patent No.: US 12,585,936 B2
(45) Date of Patent: Mar. 24, 2026

(54) NEURAL LOGIC CONTROLLERS

(71) Applicant: Siemens Aktiengesellschaft, Munich (DE)

(72) Inventors: Arquimedes Martinez Canedo, Plainsboro, NJ (US); Hasan Sinan Bank, Sacramento, CA (US); Hartmut Ludwig, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 1452 days.

(21) Appl. No.: 17/259,684

(22) PCT Filed: Aug. 3, 2018

(86) PCT No.: PCT/US2018/045162
§ 371 (c)(1),
(2) Date: Jan. 12, 2021

(87) PCT Pub. No.: WO2020/027852
PCT Pub. Date: Feb. 6, 2020

(65) Prior Publication Data
US 2021/0150359 A1 May 20, 2021

(51) Int. Cl.
*G06N 3/08* (2023.01)
*G06F 8/38* (2018.01)
(Continued)

(52) U.S. Cl.
CPC .................. *G06N 3/08* (2013.01); *G06F 8/38* (2013.01); *G06F 8/41* (2013.01); *G06F 8/60* (2013.01); *G06N 3/063* (2013.01); *G05B 15/02* (2013.01)

(58) Field of Classification Search
CPC .......... G06N 3/08; G06N 3/063; G06N 3/105; G06F 8/38; G06F 8/41; G06F 8/60; G06F 9/542; G06F 9/544; G05B 15/02
See application file for complete search history.

(56) References Cited

U.S. PATENT DOCUMENTS 4,912,623 A * 3/1990 Rantala ................ G05B 19/052
700/7
9,569,291 B1 * 2/2017 Karppanen ............. G06F 9/546
(Continued)

FOREIGN PATENT DOCUMENTS

CN        1627251 A      6/2005
CN     201037908 Y      3/2008
(Continued)

OTHER PUBLICATIONS

Feng Liang, "Programmable convolutional neural network coprocessor IP core" (ip.com machine translation of CN106940815B), Feb. 13, 2017, ip.com machine translation (Year: 2017).*
Nimish Shah, "Runtime Programmable and Memory Bandwidth Optimized FPGA-Based Coprocessor for Deep Convolutional Neural Network", published Apr. 9, 2018, IEEE (Year: 2018).*
Embrio: "Embrio" 3' Dec. 2017 (Dec. 3, 2017), pp. 1-7, XP054979414 / Dec. 3, 2017.

(Continued)

*Primary Examiner* — Christopher W Carter

(57) ABSTRACT

A method for executing a machine learning model with a controller includes a processor within the controller writing input values to a process image within the controller. The term process image refers to a predefined address space within volatile memory of the controller. A co-processor connected to the controller reads the input values from the process image and applies a machine learning model to the input values to generate output values. The co-processor writes output values to the process image and the processor reads those output values from the process image. The process can then execute an application program that utilizes the one or more output values.

13 Claims, 5 Drawing Sheets

(51) Int. Cl.

| | | |
|---|---|---|
| *G06F 8/41* | (2018.01) | |
| *G06F 8/60* | (2018.01) | |
| *G06N 3/063* | (2023.01) | |
| *G05B 15/02* | (2006.01) | |

(56) References Cited

U.S. PATENT DOCUMENTS

| | | | |
|---|---|---|---|
| 2009/0083522 A1 | 3/2009 | Boggs et al. | |
| 2017/0017221 A1* | 1/2017 | Lamparter | G05B 19/056 |
| 2017/0038754 A1 | 2/2017 | Lo et al. | |
| 2017/0213131 A1* | 7/2017 | Hammond | G06F 8/31 |
| 2017/0235671 A1 | 8/2017 | Jung | |
| 2019/0228308 A1* | 7/2019 | Zhou | G06F 15/17381 |
| 2020/0150638 A1* | 5/2020 | Mourzine | G05B 19/058 |
| 2021/0072738 A1* | 3/2021 | Mourzine | G05B 19/058 |

FOREIGN PATENT DOCUMENTS

| | | |
|---|---|---|
| CN | 102750127 A | 10/2012 |
| CN | 106125664 A | 11/2016 |
| CN | 106354082 A | 1/2017 |
| CN | 106940815 A | 7/2017 |
| CN | 107003988 A | 8/2017 |
| CN | 107850882 A | 3/2018 |
| DE | 102012204358 A1 | 9/2013 |
| EP | 3118697 A1 | 1/2017 |
| EP | 3343460 A1 | 7/2018 |

OTHER PUBLICATIONS

William G. Wong: "Accelerate AI with Intel's Movidius", Nov. 7, 2017 (Nov. 7, 2017), XP055573775 / Nov. 7, 2017.

International Search Report dated Jun. 7, 2019; Application No. PCT/US2018/045162; 21 pages Wong, William G.: "Accelerate AI with Intel's Movidius"; https://www.electronicdesign.com/technologies/embedded/article/21805806/accelerate-ai-with-intels-movidius; Date: Nov. 8, 2017; pp. 1-4.

Munir Handy Ali et al:"Real-Time Communication Between Personal Computer and Programmable Logic Controller for Networked Control System Based on Industrial Ethernet", 2010 International Conference on Computer Applications and Industrial Electronics (ICCAIE 2010), Dec. 5-7, 2010, Kuala Lumpur, Malaysia, Mar. 17, 2011.

Cao Dayou et al:"A Fast & Accurate Image Classifier Based on the Pre-training Models of TensorFlow", Jun. 15, 2017.

Aramaki Net al: "A New Architecture for Hi••Performance Programmable Logic Controller", Proceedings of the IECON '97 : 23rd. International Conference on Industrial Electronics, Control, and Instrumentation. New Orleans, Nov. 9-14, 1997; [Proceedings of IEEE IECON: International Conference on Industrial Electronics, Control, and Instru, Nov. 9, 1997 (Nov. 9, 1997), pp. 187-190, XP000894665, DOI: 10.1109/IECON.1997.671044 ISBN: 0-7803-3932-0.

* cited by examiner

NEURAL LOGIC CONTROLLERS

This application is a national phase filing under 35 U.S.C. § 371 of International Patent Application No. PCT/PCT/US2018/045162, filed Aug. 3, 2018, which is incorporated herein by reference in its entirety.

TECHNICAL FIELD

The present disclosure relates generally to the engineering and runtime design of neural logic controllers (PLCS with neural co-processor(s)). The various systems and methods may be applied to industrial automation applications, as well as various other applications where controllers are used.

BACKGROUND

A controller is a specialized computer control system configured to execute software which continuously gathers data on the state of input devices to control the state of output devices. Examples of controllers include programmable logic controllers, motion controllers, CNC, Smart I/O and drive controllers. A controller typically includes three major components: a processor (which may include volatile memory), volatile memory comprising an application program, and one or more input/output (I/O) ports for connecting to other devices in the automation system. Modern controllers have their own process images and data historians. Additionally, these systems often have proprietary data access interfaces to facilitate cross layer (vertical) data access between automation systems. This is also true for horizontal access between control systems at the same layer.

Recent advances in machine and deep learning have shown an increase in the intelligence of machines by using neural networks. For applications of autonomy, these advancements become important tasks such as perception, learning, and reasoning. In these applications, neural networks have large number of parameters resulting in a large number of operations. To cover real-time operations with neural networks, typical systems include an expensive set of GPUs, specialized processing units, or other distributed systems. This limits the use of neural networks in industrial controllers for autonomy applications due to the cost and physical constraints of on-board controllers.

There is a great interest from industry to utilize deep learning with applications to train the systems with large array of data as a result of the sensors and other available cyber-physical devices on factory floor. One can find different examples such as artificial intelligence (AI) accelerators (e.g., ASICs, FPGAs etc.), specialized CPUs, and GPUs. In one of the recent examples, Fujitsu has launched the AI 400 DL as AI accelerator. The accelerator runs Chainer as Deep Learning Framework and various other target frameworks. There are other examples as AI accelerators from Google (Google TPU), Knupath's Hermosa, and Intel (Lake Crest) for enhancing the AI capabilities of the industrial machines. However, these examples have similar limitations like GPUs. Moreover, to date, there is no way to link AI accelerator hardware to the controller architecture that is widely used in automation environments.

Conventional controllers lack any support for embedding neural computing features. Where neural computing capabilities are available, they generally require cloud computing systems to perform processing tasks. This limits all applications to real-time on-board processing because the computation is far away from the cyber-physical systems (e.g., industrial robots, edge and Internet of Things devices, or other machines). The other few concepts that simply add additional CPU power on the edge have the disadvantage of not running at the same cycle time as the PLC and therefore a seamless integration is very difficult, or impossible to achieve. Other more naïve implementations attempt to execute neural functions in multi-core controllers. This architecture only allows very simple neural models in the controller because CPUs are parallelizable enough to compute the massive amount of linear algebra functions required for even simple neural networks.

SUMMARY

Embodiments of the present invention address and overcome one or more of the above shortcomings and drawbacks, by providing methods, systems, and apparatuses related to engineering and the runtime execution of PLCs with neural co-processor(s) (referred to herein as "neural logic controllers"). These neural logic controllers can be used for various autonomy-related applications.

According to some embodiments, a method for executing a machine learning model with a controller includes a processor within the controller writing input values to a process image within the controller. The term "process image" refers to a predefined address space within volatile memory of the controller. A co-processor connected to the controller reads the input values from the process image and applies a machine learning model to the input values to generate output values. The co-processor writes output values to the process image and the processor reads those output values from the process image. The processor may execute an application program that utilizes the one or more output values. For example, in one embodiment, the application program uses the output values to control an automation system device external to the controller.

According to other embodiments, a system for executing machine learning code within a controller device includes a programmable logic controller (PLC) comprising a non-transitory storage medium, a processor, and a co-processor. The processor executes a plurality of instructions. A subset of the instructions depends on execution of machine learning code not executable by the processor. The co-processor is connected locally to the PLC. For example, in one embodiment, the co-processor is a neural compute stick connected to the PLC via USB. The co-processor is configured to receive input values from the processor via the non-transitory storage medium. The co-processor uses the input values to execute the machine learning code, thereby yielding one or more output values. Once the output values are generated, they may be transferred to the processor via the non-transitory storage medium.

According to another aspect of the present invention, as described in some embodiments, a method for programming a neural computing architecture comprising a processor and a co-processor includes displaying a first graphical user interface (GUI) on a host computer. The first GUI includes a block-based editor for programming an automation program. A "neural block" is instantiated in the first GUI. The neural block comprises automation code executable by a processor within a PLC that allows the processor to execute a machine learning model on a co-processor connected to the PLC. In response to instantiation of the neural block, a second GUI is displayed that allows entry of source code corresponding to the machine learning model. In order to connect the neural block with the machine learning model, the first GUI may be used to program a portion of the automation program that interfaces with the machine learning model.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to engineering and the runtime execution of controllers with neural co-processor(s) (referred to herein as "neural logic controllers" or "NLCs"). This neural logic controllers (NLCs) can be used for various autonomy-related applications. The combination of the NLC with traditional controller hardware architecture is referred to herein as a "neural controller architecture" or "NCA." The NCA enhances conventional controller functionality by enabling, for example, on-board perception, reasoning, and inference for industrial applications AI applications.

Figure 1:
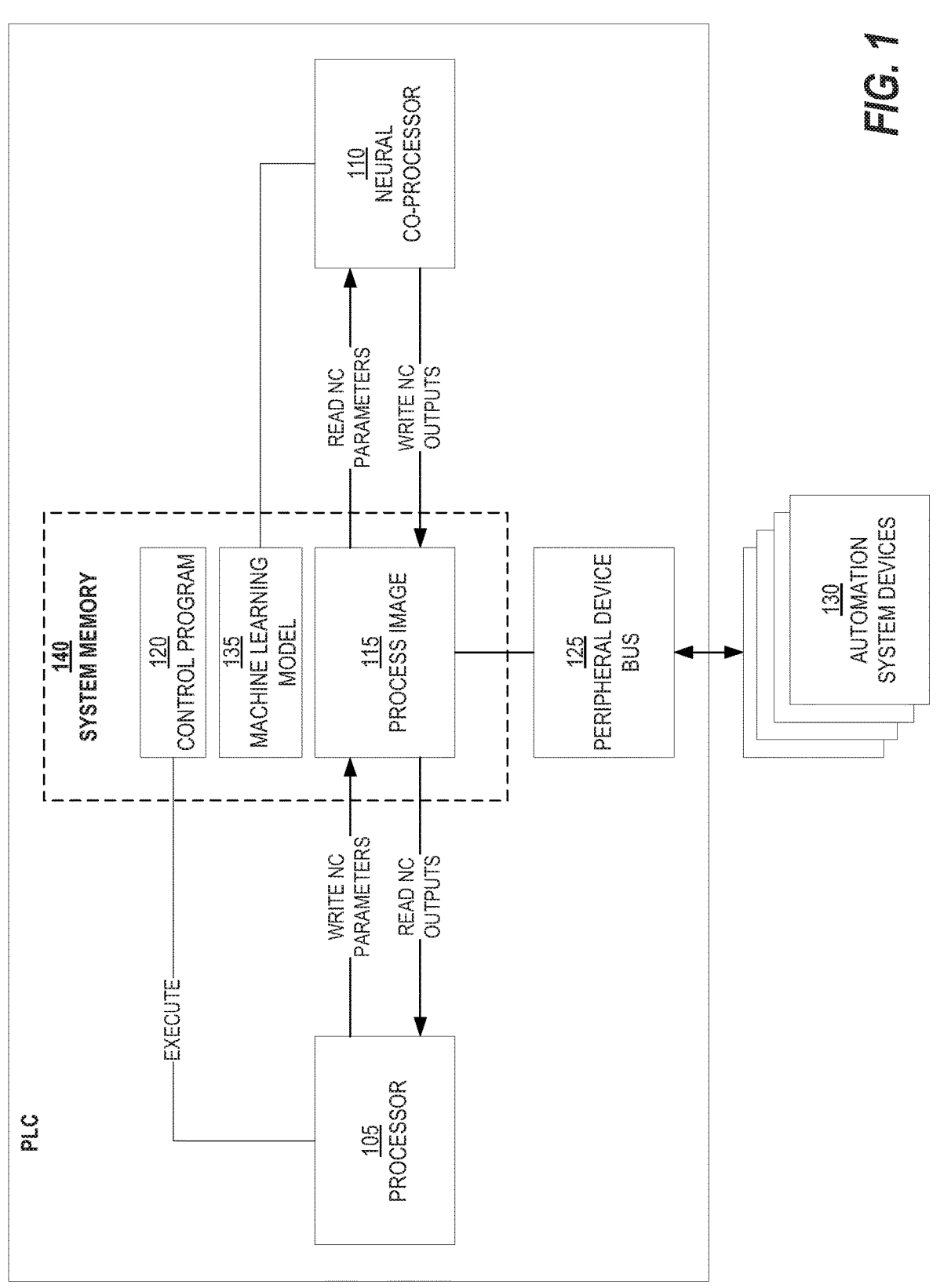
FIG. 1 illustrates NCA that may be used in some embodiments.

FIG. 1 illustrates NCA that may be used in some embodiments. Briefly, the NCA includes a PLC that comprises one or more artificial intelligence (AI) accelerators. As is generally understood in the art, AI accelerators are hardware devices that are specifically designed and configured to provide neural computation capabilities. These AI accelerators are referred to herein as "neural co-processors." In general, any PLC known in the art may be used with the techniques described herein. For example, in one embodiment, the PLC is a Linux based Siemens controller (e.g., IOT 20xx or Multifunctional Controller Platform).

In FIG. 1, there is one Neural Co-Processor 110; however, in general, any number of neural co-processors could be included in the NCA. Each neural co-processor is a microprocessor designed to accelerate artificial neural networks and other machine learning applications. Any type of AI accelerator known in the art may be used as the Neural Co-Processor 110 in the NCA. In some embodiments, the Neural Co-Processor 110 is a processor unit installed in the PLC. In other embodiments, the Neural Co-Processor 110 is a neural compute stick such as the Intel Movidius™. As is generally understood in the art, a neural compute stick is a small form factor device that performs the function of a single board computer but can connect to another device using a Universal Serial Bus (USB) connection or a similar connection mechanism.

Aside from the Neural Co-Processor 110, the PLC of the NCA includes a Processor 105, System Memory (comprising a Process Image 115 and a Control Program 120), and a Peripheral Device Bus 125 that allows communication with one or more Automation System Devices 130. The Process Image 115 is a predefined address space in the PLC's System Memory 140 which is updated in each processing/scan cycle based on data associated with the Neural Co-Processor 110 and the Automation System Devices 130. In each processing step, the Processor 105 reads the Process Image 115, executes deployed application logic from the Control Program 120, and writes results back into the Process Image 115. In general any type of automation system device can be used with the systems discussed herein including, without limitation, field devices, robots, conveyor belts, etc.

The Control Program 120 in this example includes code that depends on execution of a Machine Learning Model 135 stored in the PLC's System Memory 140. The Machine Learning Model 135 may be understood as an artificial neural network or other machine learning application. The software code corresponding to the Machine Learning Model 135 is referred to herein as "neural code" or NC. The NC may comprise, for example, a computational graph defined in Python language which is the de-facto language of deep learning frameworks such as TensorFlow, PyTorch, Caffe, Keras, etc. The computational graph is conceptually a series of operations arranged as a graph of connected nodes. Each node corresponds to an operator, variable, or a constant. The computational graph may be coded directly in a GUI provided by the Neural Editor. As a simple example, the automation engineer may use the TensorFlow library to define two constants as "a=constant(1)" and "b=constant(2)." These two constants are then nodes in the computational graph. A third node can be defined that adds the constants together: "add op=add (a,b)." Using this basic methodology, computational graphs can be assembled that perform more complex functions such as learning through the optimization of loss functions. Computational graphs are generally known in the art and, thus, are not described in detail herein.

In this example, the Processor 105 communicates with the Neural Co-Processor 110 via the Process Image 115. This process is described in greater detail below with respect to FIG. 4. Briefly, the Processor 105 writes NC parameters (e.g., inputs values to the Machine Learning Model 135) to the Process Image 115. The Neural Co-Processor 110 reads these parameters, executes the NC, and writes any outputs (i.e., output values generated by the Machine Learning Model 135) back to the Process Image 115. The Processor 105 then reads these outputs from the Process Image 115 and uses them to perform further processing of the Control Program 120.

As a practical example of how the NCA can be applied to automation applications, consider the domain of robot vision. A robot can be configured to "see" by using a camera to take images of a scene and then applying an object detection algorithm to the images. In general, image processing and object detection algorithms are processor-intensive and ill-suited for execution within the Processor 105 of the PLC. However, the Neural Co-Processor 110 is optimized for such processing. Thus, the robot can pass image data to the PLC where the Neural Co-Processor 110 processes the images and identifies objects in the production environment. Based on the detected objects, the Processor 105 may provide instructions to the robot that allow the robot to, for example, pick up the objects or avoid the objects during movement within the production environment.

Figure 2:
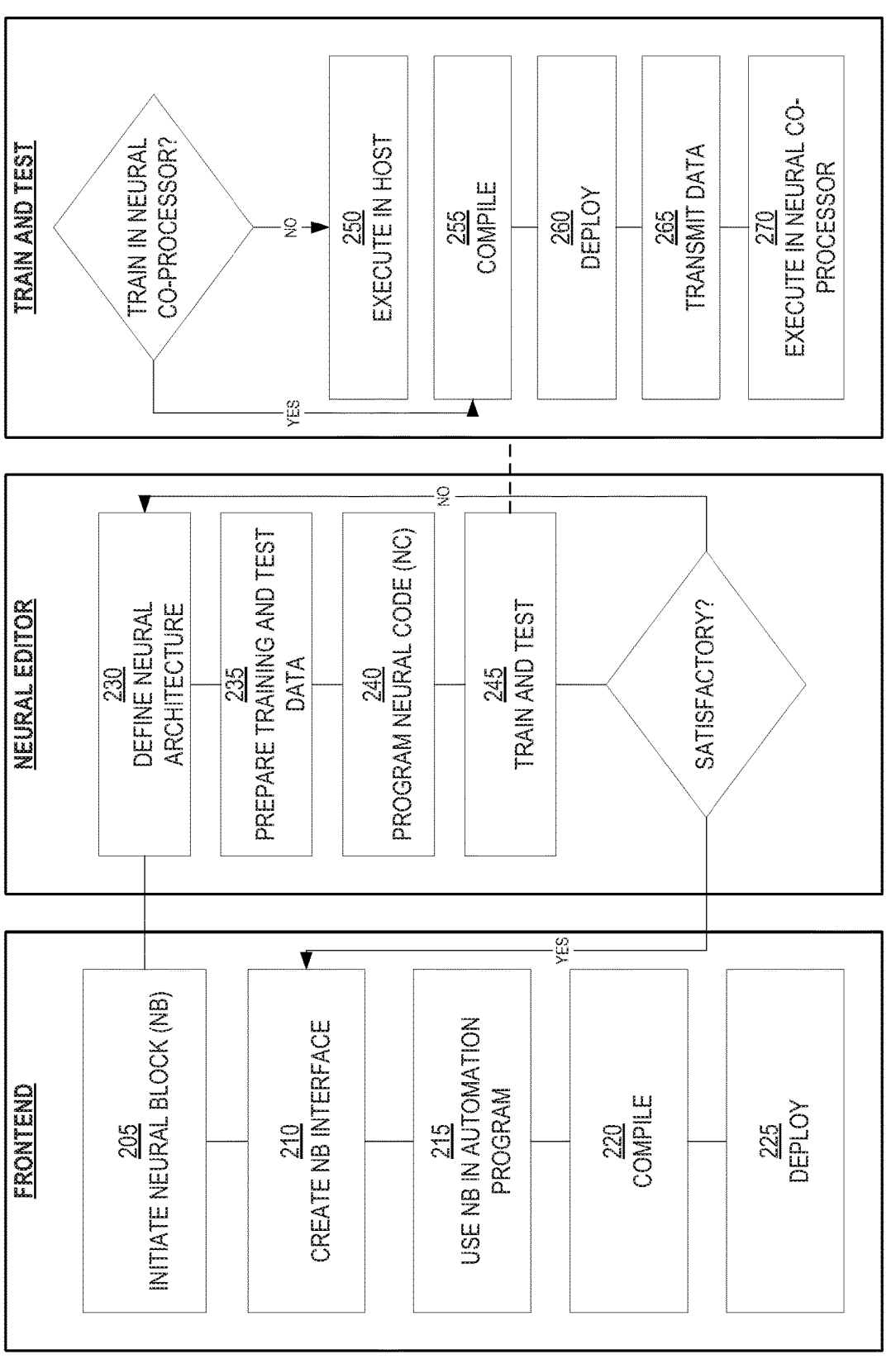
FIG. 2 illustrates an example procedure for generating an NLC, according to some embodiments.

FIG. 2 illustrates an example procedure for generating an NLC, according to some embodiments. The procedure begins at step 205 with an automation engineer instantiating a specialized block of code, referred to herein as a "neural block" or "NB," in a frontend editor. This instantiation may be performed, for example, by typing a list of commands into the frontend editor or dragging a visualization of a neural block into a GUI that allows block-based visual coding. The frontend editor in this example is software that allows the automation engineer to perform control programming, and possibly other tasks such as configuration of various parameters and settings used by the controller. One example of a frontend editor is the Siemens Totally Integrated Automation (TIA) Portal™.

The neural block is similar to a function block (FB) and it serves the purpose of being the interface between the automation code and the neural code. In the example of FIG. 2, creation of the NB triggers a specialized editor, referred to herein as the "Neural Editor" to be displayed. In some embodiments the Neural Editor can be an add-on of the frontend editor, or a separate Integrated Development Environment (IDE) such as Jupyter notebooks or Visual Studio Code. At step 230, the Neural Editor allows the automation engineer to define the neural architecture. In general, any neural architecture can be used with the techniques described herein. Thus, for example, in some embodiments, the Neural Editor allows the automation engineer to select from well-known architectures such as feed-forward neural networks, recurrent networks, and symmetrically connected networks. As is generally understood in the art, a neural architecture has a number of parameters associated with it such as the number and type of layers included in the architecture. At step 230, the automation engineer may specify each of these parameters, for example, by entering values in the GUI displayed within the Neural Editor. In some embodiments, the Neural Editor may provide predefined values selected, for example, based on previous architectures generated by the automation engineer.

Next, at step 235, the Neural Editor allows the automation engineer to prepare labeled data items for training and testing of the neural architecture. The specific details of what data will be used for training and testing will depend on the intended task to be performed by the NC. Various techniques may be used for specifying the data. For example, in some embodiments, the Neural Editor includes a GUI that allows the automation engineer to upload a data file that comprises all of the data. The data file may expressly state which data items are to be used for training or testing; alternatively, the GUI may allow the automation engineer to divide the data into training and test groups after it is uploaded to the Neural Editor. In other embodiments, the automation may be able to manually enter data or edit existing data items through the GUI.

Continuing with reference to FIG. 2, at step 240, the automation engineer uses the Neural Editor to program the NC. As described above with respect to FIG. 1, the contents of the NC will depend on the deep learning framework being employed. For example, in one embodiment, the NC comprises a computational graph defined in the Python language. Thus, the programming performed at step NC includes the automation engineer entering the Python statements that define the computational graph. After programming is complete, the resulting NC is trained and tested at step 245. The details of how training and testing are performed will depend on the framework employed. For example, for TensorFlow implementations, a "session" facilitates the execution of a graph or part of computation graphs on one or more machines. Training is performed by starting a session, initializing any variables, and running an optimizer over batches of training data. Once training is complete, the session variables can be stored and used to restore the session at any time. Using the test data as input to the session, testing of the NC may then be performed.

In FIG. 2, steps 250-270 illustrate how training and testing could be implemented. In this example, two configurations are supported: training on the local host computer (e.g., laptop or the cloud) or training on the neural co-processor. In general, processing on the neural co-processor should be more efficient and quicker than execution on the host computer; however, in some situations the neural co-processor may be unavailable and the host computer must be used for execution. For the simple case of execution on the host computer, processing is performed at step 250. Aside from execution, in some instances the NC must also be compiled prior to execution (this step is not shown in FIG. 2). Similarly, if training is to be performed on the neural co-processor, the NC is compiled on the host computer for the co-processor at step 255 using the compiler software corresponding to the co-processor architecture. Then, at step 260 the compiled NC is deployed to the neural co-processor and, at step 265 the data for training/testing is transmitted to the neural co-processor. Finally, at step 270, the compiled NC is executed in the neural co-processor to perform training/testing.

Based on the output of the NC from the testing stage, the automation engineer can determine whether or not the trained computational graph produces satisfactory results. That is, the automation engineer determines the differences between the output generated by the NC and the original labels of the test data. If the differences are below a threshold amount, the NC is deemed satisfactory; otherwise, the process of creating the NC is repeated starting at step 230. In some embodiments, the process of determining whether the results are satisfactory can be automated such that the automation engineer's assistance is not directly needed.

After completing the task with the Neural Editor, the control is returned to the frontend. With the NB designed and tested, the automation engineer creates an NB interface at step 210 in the target language of the controller platform. For example, for implementations on Siemens SIMATIC systems, the interface may be created in Ladder (LAD), statement list (STL), or Structured Control Language (SCL). The interface can be conceptually understood to be a wrapper around the NB, allowing other FBs in the automation program to call the NB. Thus, the interface may include specifications for methods, variables, etc., that objects should use to execute with the NB. At step 215, the NB is used in the automation program (e.g., by connecting it to other FBs). Finally, at steps 220 and 225, the NB is compiled and deployed to the neural co-processor.

Figure 3:
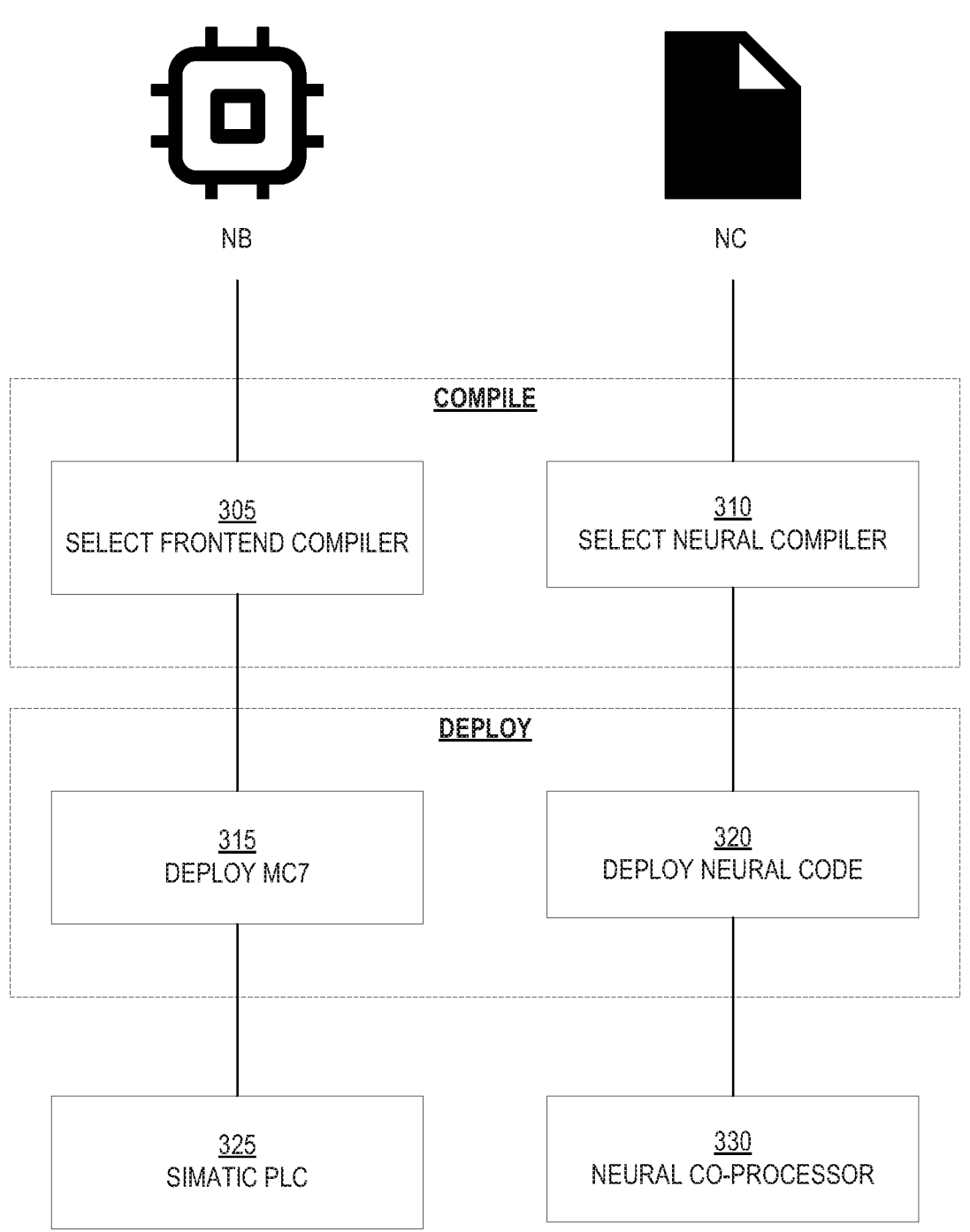
FIG. 3 provides additional details regarding the compilation and deployment stages, according to some embodiments.

FIG. 3 provides additional details regarding the compilation and deployment stages, according to some embodiments. In this example, it is assumed that the target platform is a Siemens SEMATIC PLC; however, it should be understood that the general principals discussed below are readily applicable to other types of PLC as well.

On the left-hand side of FIG. 3, a frontend compiler is selected at 305. The selected compiler is used to compile the NB into the target SIMATIC language to make it interoperable with the rest of the automation program such as FBs, FCs, and DBs. On the right-hand side, the NC is compiled into the target framework by selecting the appropriate neural compiler at step 310. These neural compilers are provided by the existing deep learning frameworks including Tensorflow. For example, the NB compilation results in MC7+ code. For NC, compilation results in compiled NC (typically machine code for a GPU).

As noted above in the discussion of FIG. 2, the training and testing process for neural networks can be performed either in the host system (e.g., laptop or the cloud) or in the neural co-processor(s). The advantage of having the neural co-processor is that the training can also be performed directly in the NCA. This requires compilation, deployment of the NC, transmitting the training data, execution and collection of results back to the neural editor. Otherwise, the training is performed locally in the host. At step 315, the MC7 code is deployed to the PLC using the SIMATIC 325 protocol existing in TIA Portal. Similarly, at step 320, the compiled NC is deployed to the neural co-processor 330 in the NCA.

Figure 4A:
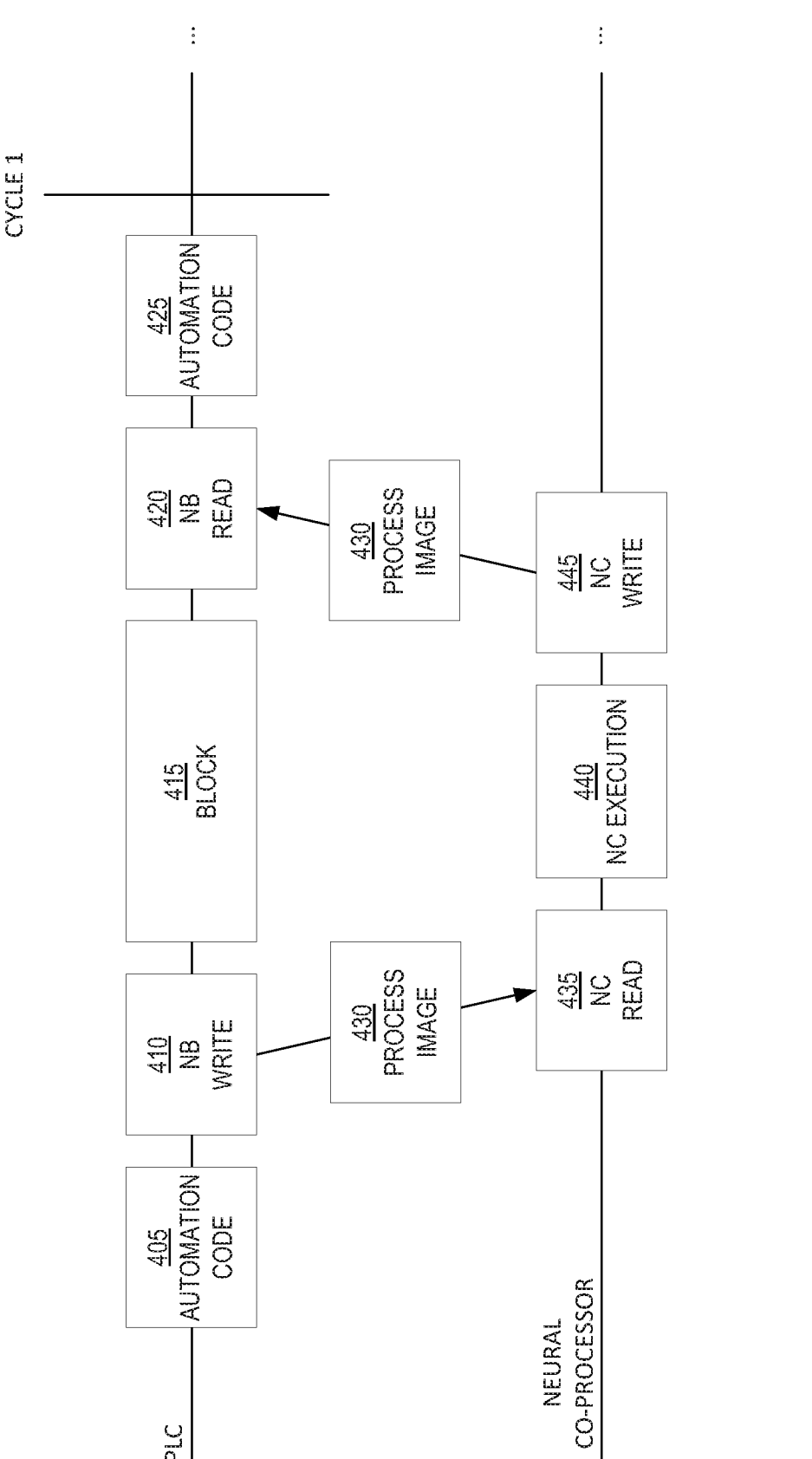
FIG. 4A illustrates the runtime interactions between Neural Co-Processor and the PLC, according to some embodiments.

FIG. 4A illustrates the runtime interactions between Neural Co-Processor and the PLC, according to some embodiments. The task of the runtime is to coordinate the execution of the automation code in the PLC's control program and the neural functions in the neural co-processor. One challenge to the runtime operation is ensuring that real-time communication occurs between the automation program executed in the PLC and the neural program executed in the neural co-processor. However, a major advantage of this interaction is that the PLC process image can be made available to the neural coprocessor during runtime. Bringing the neural functions directly to the sensor data provides an unprecedented advantage because perception, inference, and reasoning functions can access full resolution data that the PLC or the controller has access to.

In FIG. 4A, the PLC executes Automation Code 405 that is part of the control program. During this execution, the PLC encounters a NB Write Command 410. This causes data to be written to the Process Image 430. The PLC then executes a Block 415 of code while the PLC awaits the results of processing by the Neural Co-Processor. The Block 415 may perform one or more functions that do not require the results of the processing being performed by the Neural Co-Processor; alternatively, the Block 415 may be a "dummy" block that performs no functions (e.g., loop until the Neural Co-Processor completes processing).

The Neural Co-Processor executes an NC Read Command 435 which reads the data from the Process Image 430. The read data is then used for executing NC 440 to generate one or more outputs. The Neural Co-Processor then performs an NC Write Command 445 to write these outputs to the Process Image 430. The PLC then executes an NB Read Command 420 to read the outputs from the Process Image 430. These outputs are then used to execute additional Automation Code 425 of the control program.

There are a plurality of modes by which the processor of the PLC and the neural co-processor interact. For example, one mode is "cyclic," meaning the interaction between the processor and neural co-processor occurs every cycle. This mode is illustrated in FIG. 4A. As a second example, with a "pipeline" mode the interaction occurs whenever the PLC or the neural co-processor has new data. A control signal may be toggled when this occurs to warn the receiver that new data is provided. Otherwise the control signal is off and the receiver can either ignore the input from the process image or use the latest values. As a third example, the PLC and the neural co-processor may operate independently. The two computations are expected to be executed independently from each other. Whenever there is a need, communication, message passing or explicit communication may be requested by placing a particular message in the process image.

Figure 4B:
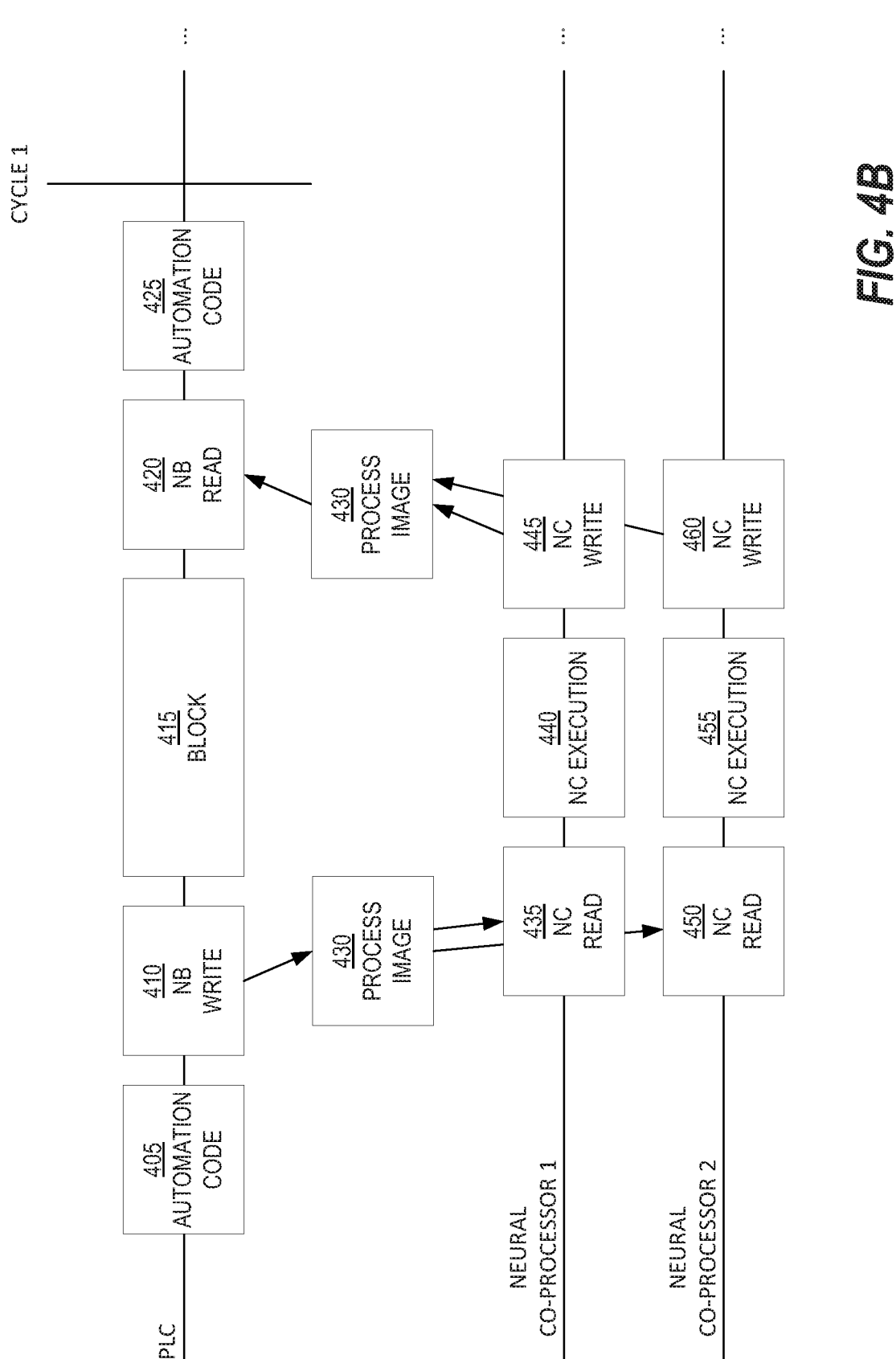
FIG. 4B shows an alternative implementation of the NCA where multiple Neural Co-Processors are used in parallel to shorten the processing time and enhance the computational power of NCA.

FIG. 4B shows an alternative implementation of the NCA where multiple Neural Co-Processors are used in parallel to shorten the processing time and enhance the computational power of NCA. In this example there are two neural co-processors; however, this concept can readily be scaled to any number of co-processors. In addition to the runtime interactions described above with respect to FIG. 4A, the second co-processor performs an NC Read Command 450 to read the NC from the Process Image 430. The second co-processor then executes the NC 455 in parallel with the first co-processor's NC execution 440. The second processor then executes an NC Write Command 460 to write results to the Process Image 430 that, in turn, are read by the PLC. Note that, in this example, the Automation Code 405 may be coded explicitly to support parallelization. For example, in one embodiment, the Automation Code 405 divides a dataset into a plurality of subsets. An NB is generated for each subset and then the NB Write Command 410 is used to write the NBs to the Process Image 430. Each individual NB is addressed to one of the Neural Co-Processors. The PLC reads the results back from the Process Image 430, and the Automation Code 425 aggregates the results.

Various devices described herein (including, without limitation to the embedded controllers and related computing architectures) may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

We claim:

1. A method for executing a machine learning model with a controller, the method comprising:

writing, by a processor within the controller, one or more input values to a process image within the controller, wherein the process image is a predefined address space within volatile memory of the controller, wherein the input values include parameters of a neural code corresponding to a machine learning model;

reading, by a co-processor connected to the controller, the input values during runtime of the controller from the process image;

executing, by the co-processor, the neural code using the input values to generate one or more output values;

writing, by the co-processor, the one or more output values to the process image;

reading, by the processor, the one or more output values from the process image; and executing, by the processor, a control program that utilizes the one or more output values.

2. The method of claim 1, wherein the control program uses the output values to control an automation system device external to the controller.

3. The method of claim 1, wherein during a first scan cycle: (i) the input values are written to the process image by the processor, and (ii) the input values are read from the process image by the co-processor.

4. The method of claim 1, wherein during a first scan cycle: (i) the output values are written to the process image by the co-processor, and (ii) the output values are read from the process image by the processor.

5. The method of claim 1, further comprising:

after writing the input values to the process image, toggling a control signal in the process image to notify the co-processor to read the input values; and after writing the output values to the process image, toggling the control signal in the process image to notify the processor to read the output values.

6. The method of claim 1, further comprising:

after writing the input values to the process image, sending a first message to the co-processor indicating the availability of the input values in the process image; and after writing the output values to the process image, sending a second message to the processor indicating the availability of the output values in the process image.

7. The method of claim 1, wherein the co-processor is a neural compute stick.

8. The method of claim 1, wherein the co-processor is housed in the controller.

9. A system for executing machine learning code within a controller device, the system comprising:

a programmable logic controller (PLC) comprising:

a non-transitory storage medium storing a process image;

a processor executing a plurality of instructions, wherein a subset of the instructions depend on execution of machine learning code not executable by the processor;

a co-processor connected locally to the programmable logic controller and configured to:

(i) read input values during runtime of the programable logic controller from the process image, wherein the input values are written by the processor to the process image, the input values including parameters of the machine learning code, (ii) use the input values to execute the machine learning code, thereby yielding one or more output values, and (iii) write the one or more output values to the process image, wherein the processor is configured to read the one or more output values from the process image and execute a control program that utilizes the one or more output values.

10. The system of claim 9, wherein the co-processor is a neural compute stick connected to the PLC.

11. The system of claim 10, wherein the neural compute stick is connected to the programmable logic controller via a Universal Serial Bus (USB) connection.

12. The system of claim 9, wherein the non-transitory storage medium, the processor, and the co-processor are housed together in a single unit.

13. The system of claim 9, wherein the processor generates control instructions for one or more automation devices using the output values.

* * * * *